US005148827A

United States Patent [19]

Masters

[11] Patent Number: 5,148,827

[45] Date of Patent: Sep. 22, 1992

[54] AIR-OIL FULL HYDRAULIC RESERVOIR TANK

[75] Inventor: Howard A. Masters, Bartlett, Tenn.

[73] Assignee: Delaware Capital Formation, Inc., Wilmington, Del.

[21] Appl. No.: 798,186

[22] Filed: Nov. 26, 1991

[51] Int. Cl.$^5$ .............................................. F16K 31/22

[52] U.S. Cl. ..................................... 137/209; 137/192

[58] Field of Search ................ 137/209, 206, 194, 192

[56] References Cited

U.S. PATENT DOCUMENTS

| | | | |
|---|---|---|---|
| 1,738,809 | 12/1929 | Walter | 137/194 X |
| 1,975,551 | 10/1934 | Logette et al. | 254/93 |
| 2,336,817 | 12/1943 | Thompson | 137/194 X |
| 2,490,823 | 12/1949 | Manning | 60/51 |
| 2,593,630 | 4/1952 | Thompson | 254/89 |

FOREIGN PATENT DOCUMENTS

| | | | |
|---|---|---|---|
| 19026 | 12/1888 | United Kingdom | 137/194 |

OTHER PUBLICATIONS

Dover Corporation, Rotary Lift Division, *New Edition Service Manual For Air Operated Auto and Truck Lifts* (1988) at 12.

Dover Corporation, Rotary Lift Division, *FP46 Mark VII Frame Lift* (1989), at 2–4.

Dover Corporation, Rotary Lift Division, *Model FP46 A&H MK VII Parts Breakdown* (1990), at 2.

Dover Corporation, Rotary Lift Division, *Model DTRP28H* (1989), at 2, 4–5.

*Primary Examiner*—Alan Cohan

*Attorney, Agent, or Firm*—Walker, McKenzie & Walker

[57] ABSTRACT

An air-oil full hydraulic reservoir tank of the type used with a vehicle lift system. The tank includes a tank wall forming the tank and a discharge pipe within the tank. The discharge pipe includes an inlet tube portion, an outlet tube portion, each extending through an upper portion of the tank, and a connection, such as a connecting loop portion or a passageway in a casting, within a lower portion of the tank, that joins the lower ends of the inlet and outlet tube portions. A low oil control mechanism within the tank blocks the flow of hydraulic oil from the inlet tube portion to the outlet tube portion when the level of the oil is below a predetermined level, thereby preventing the flow of air through the outlet tube. The inlet tube may be perforated, and the low oil control mechanism may be a float within the inlet tube that rests on a valve seat to block the flow of air into the outlet tube. A connecting pipe joins the reservoir tank to a hydraulic lift cylinder, with interposed control valves. The hydraulic lift cylinder raises and lowers a piston as air is forced into or bled from the reservoir tank, forcing oil from the reservoir tank into and from the lift cylinder.

13 Claims, 2 Drawing Sheets

AIR-OIL FULL HYDRAULIC RESERVOIR TANK

BACKGROUND OF THE INVENTION

The present invention relates, in general, to hydraulic reservoirs for vehicle lift systems, and in particular, to "full hydraulic" air-oil tanks with internal low oil control mechanisms on vehicle lift systems.

Hydraulic lift systems for vehicles are well-known. In addition to well-known "semi-hydraulic" or so-called "airdraulic" lift systems, in which air is forced into and over an oil-filled piston within a lift cylinder, "full-hydraulic" lift systems are also well-known designs for such vehicle lifts. In a full hydraulic lift system, only hydraulic oil is present within the lift cylinder and forces the lift piston to rise from the lift cylinder as pressurized oil is introduced into the cylinder.

A full hydraulic lift system requires, as a component part, an air-oil reservoir tank coupled by pipe to the lift cylinder. As air is introduced into the reservoir tank, oil is forced therefrom and into the lift cylinder, raising the lift piston. While there is no requirement as such, in many full hydraulic lift systems the air-oil reservoir tank is buried underground beside the lift cylinder to conserve work space above ground.

It is also well-known that since February, 1974, ANSI standard B153.1 requires some form of low oil control mechanism as a part of a full hydraulic lift system in order to prevent the entry of air into the lift cylinder for safety reasons. If the oil level within the reservoir tank, which necessarily falls and rises as the lift piston raises and lowers as oil from the reservoir tank is forced into the lift cylinder, becomes too low, the air that is being forced into the reservoir tank will enter the lift cylinder. Because air is a compressible fluid, unlike hydraulic oil, a hydraulic lift under load with air in the lift cylinder, as with a vehicle atop the lift, will tend to rapidly propel the lift piston from the lift cylinder when the load is removed, i.e., driven off the lift, due to the rapid expansion of the air in the lift cylinder with the removal of the load. To avoid this unsafe condition, full hydraulic lift systems provide a low oil control mechanism to shut off the flow of oil from the reservoir tank to the lift cylinder when the oil level in the reservoir tank is below a predetermined level, thereby preventing air from entering the lift cylinder.

One well-known low oil control mechanism employs a perforated guide tube extending from the top of the reservoir tank, with an opening therein for filling the tank with oil and for maintenance, to the bottom of the tank. A hollow float, having a positive buoyancy in the oil, rides within the guide tube for resting upon and blocking a valve seat at the bottom of the tank. It shall be understood that the phrase "having a positive buoyancy in the oil," as used herein, refers to the tendency of the float to rise to the surface of the oil when submerged therein. A connecting pipe, extending through the bottom of the tank and joining to the guide tube, with the valve seat located therein at the junction with the guide tube, joins the reservoir tank with the lift cylinder and has various control valves interposed therein for regulating and controlling the flow of oil to and from the reservoir tank and lift cylinder.

Such a design, with the connection between the lift cylinder and the reservoir tank joining the reservoir tank at the bottom thereof, has several problems. First and most important, in some localities the presence of moisture, electrolytes, and stray currents within the soil causes corrosion of the connecting pipe attached to a buried reservoir tank. The corrosion effects increase with distance from the surface of the ground, due to the presence of increased moisture and electrolytes at greater depths, and are rarely seen near the ground surface. The corrosion damage is therefore most acute at the bottom of the reservoir tank where the connecting pipe joins with reservoir tank. Known solutions to this corrosion problem include the use of a cathodic protection system or the wrapping of the connection pipe in a protective coating of tape. In practice, though, such protection is difficult to achieve, as the connecting pipe is not joined to the reservoir tank until after the reservoir tank is deep within an excavated hole. Working in close quarters down in the excavated hole, workmen occasionally inadvertently leave unprotected areas or "holidays" on the connecting pipe as they attempt to wrap the pipe in protective tape. Such unprotected areas act to concentrate the corrosion in localized exposed regions on the pipe, causing, in fact, more rapid failure than would be otherwise seen with a completely bare connecting pipe. Even though test equipment, such as dielectric strength meters, exist for testing the protection of a pipe, the use of such equipment is cumbersome down in a hole on a construction site.

Another problem, alluded to above, is the difficulty of fastening a connecting pipe to the bottom fitting on a reservoir tank. And, since the connecting pipe must pass through control valves at the surface of the ground, various elbows and fittings must be installed therein to allow the connecting pipe to bend from the bottom of the reservoir tank and rise to the ground surface. Because the reservoir tank may only be secured to the connecting pipe after placement within an excavated hole, a worker performing the installation often must join the connecting pipe and various fittings in a confined space, frequently producing suboptimal results such as a leaky joint at one of the multiple connecting pipe elbows or fittings.

Finally, the necessity of providing a connection to the tank at a bottom fitting prevents the manufacturer of the tank from completely encasing or sealing the lower end of the tank with protective material, such as fiberglass reinforced plastic, during manufacture in order to protect the tank from corrosion. Because protection can only be applied once the reservoir tank is lowered into its excavation hole and the connecting pipe is attached, protection of the tank during manufacture is precluded.

It is therefore desirable to have a air-oil full hydraulic reservoir tank including internal low oil control means, that minimizes the above-mentioned problems.

SUMMARY OF THE INVENTION

The present invention is an air-oil full hydraulic reservoir tank of the type used with a vehicle lift system, and eliminates the need for external connections to lower portions of the tank. The tank comprises a tank wall forming the tank, upper and lower tank portions, and a discharge pipe within the tank. The discharge pipe includes an inlet tube portion having a first end extending through the tank wall in the upper portion of the tank and having a second end disposed in the lower portion of the tank, an outlet tube portion having a first end extending through the tank wall in the upper portion of the tank and having a second end disposed in the lower portion of the tank, and connecting means in the lower portion of the tank, for instance a connecting loop portion or a passageway through a casting, for joining the second end of the inlet tube portion to the second end of the outlet tube portion and for allowing hydraulic oil to flow between the inlet and the outlet tube portions. The tank also comprises low oil control means within the tank for blocking the flow of hydraulic oil from the inlet tube portion to the outlet tube portion when the level of the oil is below a predetermined level and for preventing the flow of air above the oil through the outlet tube portion.

It is an object of the present invention to substantially eliminate the corrosion that occurs on connecting pipes between a hydraulic lift cylinder and prior reservoir tanks. The tank should be amenable during manufacture to sealing from corrosion and full above-ground testing of its lower, and therefore most corrosion-susceptible, portion, as opposed to only permitting corrosion-proofing and testing after installation. A further object is a simplified and faster installation of the reservoir tank due to the elimination of the need to install multiple elbow joints within a connection pipe or of the need to join the connection pipe to the reservoir tank within a confined excavation hole, also thereby increasing the quality and reliability of the installed hydraulic system. Finally, it is an object of the present invention to improve the capability of the lift installer to test all of the field-installed fittings and joints on the reservoir tank.

DESCRIPTION OF THE PREFERRED EMBODIMENT

Figure 1:
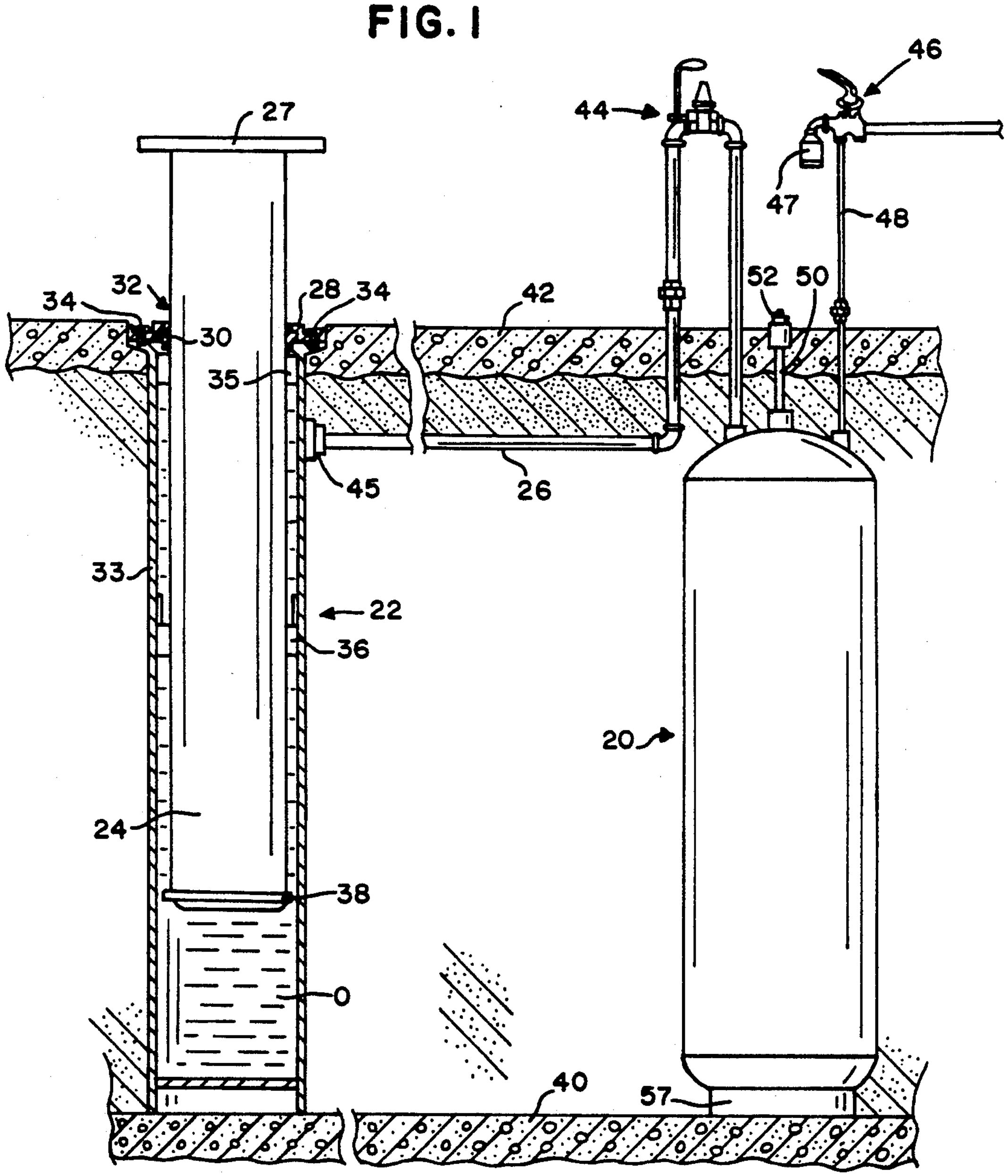
FIG. 1 is a view of the present invention shown buried underground and attached to a hydraulic lift cylinder.

Referring to FIG. 1, air-oil full hydraulic reservoir tank 20 is shown buried underground and attached to well-known hydraulic lift cylinder 22. Lift cylinder 22 includes a lift plunger or piston 24 that rises and falls in response to hydraulic oil 0 forced into and released from lift cylinder 22 through connecting pipe 26, typically a $1\frac{1}{4}$ inch pipe, that joins lift cylinder 22 and tank 20. Typically, well-known lift arms, not shown, for lifting a vehicle such as a car or truck will be attached to the top 27 of piston 24. Lift cylinder 22 also includes a well-known gland 28 securing a seal 30 to piston 24 at the mouth 32 of the casing 33 of lift cylinder 22, as by bolts 34. Upper bearing 35 and lower bearing 36 support piston 24 as it moves within lift cylinder 22 in a manner well-known to those skilled in the art, and piston 24 typically has a stop ring 38 on the lower end thereof. It is well-known for lift cylinder 22 and tank 20 to rest on a buried concrete slab 40, and, after tank 20 and lift cylinder 22 have been installed, connected, and packed thereabout with earth, for an upper concrete slab 42 to be poured thereabove at the surface of the ground.

Those skilled in the art will recognize oil control valve 44 interposed in connecting pipe 26, as well as safety check valve 45 at the junction of connecting pipe 26 with lift cylinder 22, for controlling the flow of oil 0 between lift cylinder 22 and tank 20 in the well-known manner. Also, air control valve 46 including muffler 47, interposed in air line 48 between tank 20 and an air compressor, not shown, allows control of air into and out of tank 20 in a manner well-known to those skilled in the art. Tank 20 preferably includes a fill pipe 50 extending from the top thereof to the surface of the ground, capped by removable fill plug 52 threadedly inserted thereto, for access to tank 20 in a manner hereinafter described.

Figure 2:
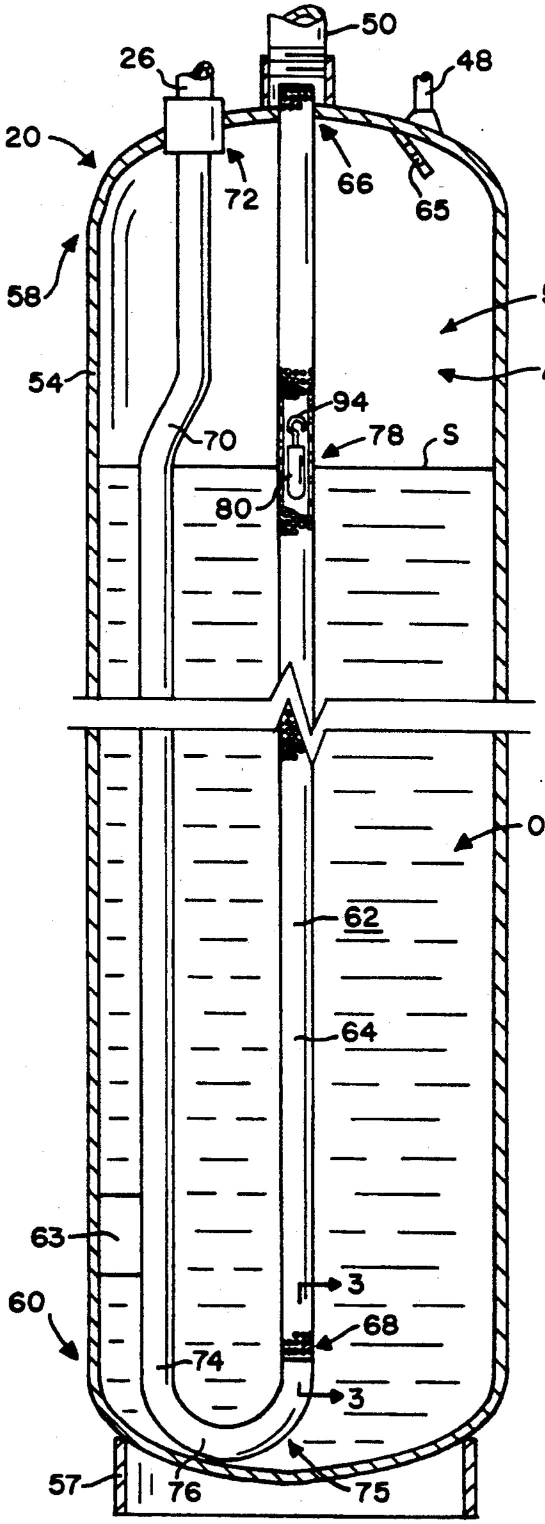
FIG. 2 is a sectional view of the present invention showing the internal discharge pipe and low oil control means.
Figure 3:
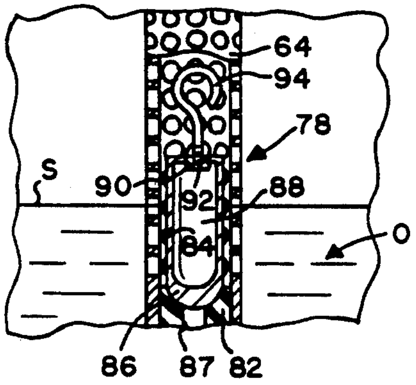
FIG. 3 is a partial sectional view showing the details of the low oil control float resting on the valve seat, taken along line 3—3 shown in FIG. 2 but with the oil at a lower level than in FIG. 2.

Turning now to FIGS. 2 and 3, the details of tank 20 may now be seen. Tank 20 includes a tank wall 54 forming tank 20 and defining an interior 56 therein, and may have a base 57 fixedly attached to the bottom of tank 20. Tank 20 has an upper portion 58 and a lower portion 60, and includes a discharge pipe 62 within the interior 56 of tank 20, preferably spaced from and fixedly attached to tank wall 54 by one or more brackets 63. Tank 20 also may have a baffle 65 for directing the entry of air into tank 20 from air line 48.

Discharge pipe 62 comprises an inlet tube portion 64, preferably perforated as shown to allow hydraulic oil 0 to communicate between the interior of inlet tube portion 64 and the exterior thereof. Inlet tube portion 64 has an upper first end 66 extending through tank wall 54 in upper portion 58 of tank 20 and has a lower second end 68 disposed in lower portion 60 of tank 20. Discharge pipe 62 also comprises an outlet tube portion 70 having an upper first end 72 extending through tank wall 54 in upper portion 58 of tank 20 and having a lower second end 74 disposed in lower portion 60 of tank 20. Discharge pipe 62 further comprises connecting means 75 in lower portion 60 of tank 20 for joining lower second end 68 of inlet tube portion 64 to lower second end 74 of outlet tube portion 70 and for allowing hydraulic oil to flow between inlet and outlet tube portions 64 and 70, respectively. In the preferred embodiment, connecting means 75 comprises a connecting loop portion 76 of discharge pipe 62, allowing the passage of oil 0 between inlet tube portion 64 and outlet tube portion 70. It will now be understood that discharge pipe 62 extends from upper portion 58 of tank 20, down to lower portion 60, and back up to upper portion 58 of tank 20, with ends 72, 66 extending through tank wall 54 in upper portion 58 of tank 20 for connection with connecting pipe 26 and fill pipe 50, respectively, using well-known pipe fittings or the like.

Tank 20 also includes low oil control mean 78 therein for blocking the flow of hydraulic oil 0 from inlet tube portion 64 to outlet tube portion 70 when the level of oil 0 is below a predetermined level and for preventing the flow of air A above oil 0 through outlet tube portion 70 and thus through connecting pipe 26. Referring to FIGS. 2 and 3, low oil control means 78 preferably comprises a float 80, having a positive buoyancy in oil 0, movable within inlet tube portion 64 for floating at the surface S of oil 0, and a valve seat 82 interposed within inlet tube portion 64 between float 80 and outlet tube portion 70 for receiving float 80 and being blocked by float 80 when the level of oil 0 is below said predetermined level. It shall be understood that the phrase "having a positive buoyancy" in oil 0, as used herein, refers to the tendency of float 80 to rise to the surface S of oil 0 when submerged therein.

Preferably, float 80 is constructed of magnesium, made hollow and "bullet-shaped" as shown, and may be spun or turned on a lathe in a manner well-known to those skilled in the art until the walls 84 thereof are relatively thin compared to thick weighted bottom portion 86, causing float 80 to float upright as it moves within inlet tube portion 64, which acts as a guide for float 80. Valve seat 82 is beveled, as by grinding or machining, to matingly seal with the bottom portion 86 of float 80 as float 80 drops onto valve seat 82, blocking passageway 87 therethrough. The size of hollow chamber 88 within float 80 is chosen, in a manner well-known to those skilled in the art, along with the weight of float 80, to cause float 80 to have a positive buoyancy in oil 0 and to cause float 80 to extend a distance, preferably two-thirds the length of float 80, below the surface S of oil 0. In this manner, as oil 0 drains through passageway 87, typically creating a vortex thereabove when the pressure of air A is so great as to quickly displace oil 0, float 80 will sealingly mate through the vortex with valve seat 82 before air A has a chance to escape through valve seat 82. It will now be understood that by properly choosing the buoyancy of float 80 and the length thereof, a predetermined level of oil 0 above valve seat 82, and therefore within tank 20, will be set below which tank 20 will not drain.

Float 80 preferably has a head 90 secured, as by heli-arc welding, to walls 84, with a tapped hole 92 therethrough. Hole 92 threadedly receives an upwardly extending hook 94. If problems develop with float 80, or if damage is suspected to valve seat 82, fill plug 52, see FIG. 1, may be removed from fill pipe 50, and a hooked wire inserted therethrough for retrieval of float 80 in a manner that will now be apparent. Fill plug 52 may also be removed to check the level of oil 0 within tank 20 and to add more oil as required.

Figure 4:
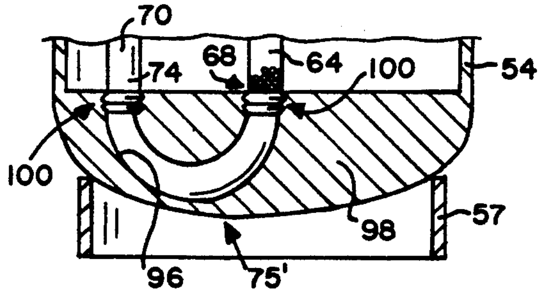
FIG. 4 is a partial sectional view of an alternate embodiment of the present invention, showing the passageway within the casting in the lower portion of the tank.

In an alternate embodiment shown in FIG. 4, connecting means 75′ comprises a passageway 96 through a casting 98 in lower portion 60 of tank 20, with ends 100 of passageway 96 joining second ends 68, 74 of inlet and outlet tube portions 64, 70, respectively, for allowing passage of oil between inlet and outlet tube portions 64 and 70. In a manner similar to that previously described and now understood, the valve seat in this alternate embodiment will be located at or near the junction of passageway 96 with inlet tube portion 64.

The elimination of any connection to the lower portion 60 of tank 20 has the advantage of eliminating the primary point of corrosion present in the prior art. Also eliminated is the need to make below-ground fitting attachments to tank 20 in close quarters at a construction site, saving time and labor as well as the expense of fitting hardware, and precluding the possibility of inadvertent leaky connections or joints being made by workers during installation at the bottom of tank 20. Tank 20 can thus be sealed, protected from corrosion, and tested during manufacture and before installation. Additionally, because all connections to reservoir tank 20 are now made to the upper and more accessible portion 58 of tank 20, the lift installer now has improved test capability of all the field-installed fittings attached to the tank.

Although the present invention has been described and illustrated with respect to a preferred embodiment and a preferred use therefor, it is not to be so limited since modifications and changes can be made therein that are within the full intended scope of the invention.

I claim:

1. An air-oil full hydraulic reservoir tank of the type used with a remotely-spaced lift cylinder of a vehicle lift system, said tank comprising:
(a) a tank wall forming said tank;
(b) an upper portion and a lower portion of said tank;
(c) a discharge pipe within said tank, said discharge pipe comprising:
i. an inlet tube portion having a first end extending through said tank wall in said upper portion of said tank and having a second end disposed in said lower portion of said tank;
ii. an outlet tube portion having a first end extending through said tank wall in said upper portion of said tank and having a second end disposed in said lower portion of said tank; and
iii. connecting means in said lower portion of said tank for joining said second end of said inlet tube portion to said second end of said outlet tube portion and for allowing hydraulic oil to flow between said inlet and said outlet tube portions;
(d) an air line in communication with the interior of said tank, extending through said tank wall in said upper portion of said tank remote from where said first end of said inlet tube extends through said tank wall, for admitting pressurized air into said tank and for releasing pressurized air from said tank; and
(e) low oil control means within said tank for blocking the flow of said oil from said inlet tube portion to said outlet tube portion when the level of said oil is below a predetermined level and for preventing the flow of air above said oil through said outlet tube portion.

2. The tank as recited in claim 1 wherein said low oil control means comprises:
(a) a float, having a positive buoyancy in said oil, movable within said inlet tube portion for floating at the surface of said oil; and
(b) a valve seat interposed within said inlet tube portion between said float and said outlet tube portion for receiving said float and being locked by said float when the level of said oil is below said predetermined level.

3. In combination, a hydraulic lift cylinder of a vehicle lift system and an air-oil full hydraulic reservoir tank of the type used with said vehicle lift system, said hydraulic lift cylinder being remotely and horizontally spaced from said tank, said tank comprising:
(a) a tank wall forming said tank;
(b) an upper portion and a lower portion of said tank;
(c) a discharge pipe with said tank, said discharge pipe comprising:
i. an inlet tube portion having a first end extending through said tank wall in said upper portion of said tank and having a second end disposed in said lower portion of said tank;
ii. an outlet tube portion having a first end extending through said tank wall in said upper portion of said tank and having a second end disposed in said lower portion of said tank; and
iii. a connecting loop portion in said lower portion of said tank connecting said second end of said inlet tube portion to said second end of said outlet tube portion;
(d) an air line in communication with the interior of said tank, extending through said tank wall in said upper portion of said tank remote from where said first end of said inlet tube extends through said tank wall, for admitting pressurized air into said tank and for releasing pressurized air from said tank; and (e) low oil control means within said tank for blocking the flow of hydraulic oil from said inlet tube portion to said outlet tube portion when the level of said oil is below a predetermined level and for preventing the flow of air above said oil through said outlet tube portion, said combination additionally comprising a connecting pipe joining said first end of said outlet tube portion to said hydraulic lift cylinder for passing said oil between said tank and said hydraulic lift cylinder.

4. The tank as recited in claim 3 wherein said low oil control means comprises:

(a) a float, having a positive buoyancy in said oil, movable within said inlet tube portion for floating at the surface of said oil; and (b) a valve seat interposed within said inlet tube portion between said float and said outlet tube portion for receiving said float and being blocked by said float when the level of said oil is below said predetermined level.

5. An air-oil full hydraulic reservoir tank of the type used with a remotely-spaced lift cylinder of a vehicle lift system, said tank comprising:

(a) a tank wall forming said tank:

(b) an upper portion and a lower portion of said tank;

(c) a discharge pipe within said tank, said discharge pipe comprising:

i. an inlet tube portion having a first end extending through said tank wall in said upper portion of said tank and having a second end disposed in said lower portion of said tank;

ii. an outlet tube portion having a first end extending through said tank wall in said upper portion of said tank and having a second end disposed in said lower portion of said tank; and iii. a casting in said lower portion of said tank, said casting having a passageway therein connecting said second end of said inlet tube portion to said second end of said outlet tube portion;

(d) an air line in communication with the interior of said tank, extending through said tank wall in said upper portion of said tank remote from where said first end of said inlet tube extends through said tank wall, for admitting pressurized air into said tank and for releasing pressurized air from said tank; and (e) low oil control means within said tank for blocking the flow of hydraulic oil from said inlet tube portion to said outlet tube portion when the level of said oil is below a predetermined level and for preventing the flow of air above said oil through said outlet tube portion.

6. The tank as recited in claim 5 wherein said low oil control means comprises:

(a) a float, having a positive buoyancy in said oil, movable within said inlet tube portion for floating at the surface of said oil; and (b) a valve seat interposed within said inlet tube portion between said float and said outlet tube portion for receiving said float and being blocked by said float when the level of said oil is below said predetermined level.

7. The apparatus as recited in claim 1 in which said inlet tube portion is perforated.

8. The apparatus as recited in claim 2 in which said tank additionally comprises fill pipe means extending upwardly from and in communication with said first end of said inlet tube portion for allowing removal therethrough of said float and for filling and checking the oil within said tank.

9. The apparatus as recited in claim 3 in which said inlet tube portion is perforated.

10. The apparatus as recited in claim 4 in which said tank additionally comprises fill pipe means extending upwardly from and in communication with said first end of said inlet tube portion for allowing removal therethrough of said float and for filling and checking the oil within said tank.

11. An air-oil full hydraulic reservoir tank of the type used with a vehicle lift system, said tank comprising:

(a) a tank wall forming said tank;

(b) an upper portion and a lower portion of said tank;

(c) a discharge pipe within said tank, said discharge pipe comprising:

i. an inlet tube portion having a first end extending through said tank wall in said upper portion of said tank and having a second end disposed in said lower portion of said tank;

ii. an outlet tube portion having a first end extending through said tank wall in said upper portion of said tank and having a second end disposed in said lower portion of said tank; and iii. connecting means in said lower portion of said tank for joining said second end of said inlet tube portion to said second end of said outlet tube portion and for allowing hydraulic oil to flow between said inlet and said outlet tube portions;

(d) low oil control means within said tank for blocking the flow of said oil from said inlet tube portion to said outlet tube portion when the level of said oil is below a predetermined level and for preventing the flow of air above said oil through said outlet tube portion, said low oil control means comprising:

i. a float, having a positive buoyancy in said oil, movable within said inlet tube portion for floating at the surface of said oil; and ii. a valve seat interposed within said inlet tube portion between said float and said outlet tube portion for receiving said float and being blocked by said float when the level of said oil is below said predetermined level; and (e) fill pipe means extending upwardly from and in communication with said first end of said inlet tube portion for allowing removal therethrough of said float and for filling and checking the oil within said tank.

12. The apparatus as recited in claim 11 in which said tank additionally comprises an air line in communication with the interior of said tank, extending through said tank wall in said upper portion of said tank remote from where said first end of said inlet tube extends through said tank wall, for admitting pressurized air into said tank and for releasing pressurized air from said tank.

13. The apparatus as recited in claim 12 in which said inlet tube portion is perforated.

* * * * *

UNITED STATES PATENT AND TRADEMARK OFFICE

CERTIFICATE OF CORRECTION

PATENT NO. : 5,148,827

DATED : September 22, 1992

INVENTOR(S) : Howard A. Masters

It is certified that error appears in the above-identified patent and that said Letters Patent is hereby corrected as shown below:

Column 4, line 52: "mean 78" should be --means 78--.

Column 6, line 41: "being locked by" should be --being blocked by--.

Column 7, line 27: "said tank:" should be --said tank;--.

Signed and Sealed this

Twelfth Day of January, 1993

*Attest:*

DOUGLAS B. COMER

*Attesting Officer* *Acting Commissioner of Patents and Trademarks*